(12) United States Patent
Ky et al.

(10) Patent No.: US 11,913,656 B2
(45) Date of Patent: Feb. 27, 2024

(54) HVAC SYSTEM WITH WIRELESS WAVEGUIDE SYSTEM

(71) Applicant: Johnson Controls Tyco IP Holdings LLP, Milwaukee, WI (US)

(72) Inventors: Tri V. Ky, Waukesha, WI (US); Allison M. Ahern, New Berlin, WI (US); David C. Ullenberg, Brown Deer, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/875,217

(22) Filed: Jul. 27, 2022

(65) Prior Publication Data
US 2023/0056522 A1 Feb. 23, 2023

Related U.S. Application Data

(63) Continuation of application No. 15/898,869, filed on Feb. 19, 2018, now abandoned.

(60) Provisional application No. 62/460,434, filed on Feb. 17, 2017.

(51) Int. Cl.
| | |
|---|---|
| *F24F 11/30* | (2018.01) |
| *F24F 11/58* | (2018.01) |
| *H01Q 1/22* | (2006.01) |
| *H04L 12/28* | (2006.01) |
| *H01P 3/127* | (2006.01) |

(52) U.S. Cl.
CPC .............. *F24F 11/30* (2018.01); *F24F 11/58* (2018.01); *H01Q 1/2291* (2013.01); *H04L 12/2838* (2013.01); *H01P 3/127* (2013.01); *H04L 2012/2841* (2013.01)

(58) Field of Classification Search
CPC ........ F24F 11/30; F24F 11/58; H01Q 1/2291; H04L 12/2838; H04L 2012/2841; H01P 3/127
See application file for complete search history.

(56) References Cited

U.S. PATENT DOCUMENTS

| | | |
|---|---|---|
| 5,994,984 A | 11/1999 | Stancil et al. |
| 6,781,477 B1 | 8/2004 | Stancil |
| 8,550,370 B2 | 10/2013 | Barrett et al. |
| 9,066,224 B2 | 6/2015 | Schwengler |
| 9,198,056 B2 | 11/2015 | Schwengler |
| 2004/0253918 A1 | 12/2004 | Ezell et al. |
| 2006/0056370 A1* | 3/2006 | Hancock ............... H04W 24/00 370/254 |
| 2006/0234621 A1 | 10/2006 | Desrochers et al. |
| 2008/0307803 A1* | 12/2008 | Herzon ................. F24F 11/77 62/93 |

(Continued)

*Primary Examiner* — Yuwen Pan
*Assistant Examiner* — Angelica Perez
(74) *Attorney, Agent, or Firm* — Fletcher Yoder, P.C.

(57) ABSTRACT

A wireless waveguide system for a heating, ventilation, and air conditioning (HVAC) system. The wireless waveguide system includes a sensor that detects an environmental condition and directs a signal indicative of the environmental condition along an interior of a ductwork. A signal sensor detects a strength of the signal within the interior of the ductwork. A repeater that operates based on the strength of the signal detected by the signal sensor and repeats the signal along a communication path at least partially within the interior of the ductwork to a controller of an HVAC unit.

18 Claims, 8 Drawing Sheets

(56) References Cited

U.S. PATENT DOCUMENTS

| | | |
|---|---|---|
| 2009/0289808 A1 | 11/2009 | Prammer |
| 2009/0290526 A1 | 11/2009 | Gainey et al. |
| 2014/0112166 A1* | 4/2014 | Schwengler .......... H04L 5/0007 |
| | | 370/252 |
| 2014/0113671 A1 | 4/2014 | Schwengler |
| 2014/0260692 A1* | 9/2014 | Sharp ...................... F24F 11/74 |
| | | 73/863.23 |
| 2016/0116177 A1* | 4/2016 | Sikora ..................... F24F 11/74 |
| | | 165/250 |
| 2016/0259351 A1* | 9/2016 | Barrett ................... F24F 3/044 |
| 2017/0321917 A1* | 11/2017 | Nickel ..................... F24F 11/76 |
| 2017/0366249 A1 | 12/2017 | Van Oost et al. |

* cited by examiner

HVAC SYSTEM WITH WIRELESS WAVEGUIDE SYSTEM

CROSS-REFERENCE TO RELATED APPLICATIONS

This is a continuation application of U.S. patent application Ser. No. 15/898,869, entitled "HVAC SYSTEM WITH WIRELESS WAVEGUIDE SYSTEM," filed Feb. 19, 2018, which claims priority from and the benefit of U.S. Provisional Application No. 62/460,434, entitled "HVAC DUCTWORK SYSTEM WITH INTEGRATED WIRELESS WAVEGUIDE," filed Feb. 17, 2017, each of which is hereby incorporated by reference in its entirety for all purposes.

BACKGROUND

The present disclosure relates generally to communication in a heating, ventilation, and air conditioning (HVAC) system.

Heat exchangers are used in (HVAC) systems to exchange energy between fluids. Typical HVAC systems have two heat exchangers commonly referred to as an evaporator coil and a condenser coil. The evaporator coil and the condenser coil facilitate heat transfer between air surrounding the coils and a refrigerant that flows through the coils. For example, as air passes over the evaporator coil, the air cools as it loses energy to the refrigerant passing through the evaporator coil. In contrast, the condenser facilitates the discharge of heat from the refrigerant to the surrounding air. In some HVAC systems, air is supplied to the condenser and evaporator coils using air-handling units (AHU) located on a rooftop of a building. In order to communicate with the AHU, additional perforations may be formed in the building envelope to run cables between sensors in the building and the controller of the AHU. These perforations may enable water, air, and pests to enter the building as well as increases the costs of setting up and operating the HVAC system.

SUMMARY

The present disclosure relates to a wireless waveguide system for a heating, ventilation, and air conditioning (HVAC) system. The wireless waveguide system includes a sensor that detects an environmental condition and directs a signal indicative of the environmental condition along an interior of a ductwork. A signal sensor detects a strength of the signal within the interior of the ductwork. A repeater that operates based on the strength of the signal detected by the signal sensor and repeats the signal along a communication path at least partially within the interior of the ductwork to a controller of an HVAC unit.

The present disclosure also relates to a wireless waveguide system for a heating, ventilation, and air conditioning (HVAC) system. The wireless waveguide system includes a sensor that detects a characteristic of air in an enclosed space and emits a signal indicative of the characteristic along a communication path through an interior of a ductwork to a controller of an HVAC unit. A repeater is placed within the ductwork along the communication path and is positioned proximate a bend in the ductwork. The repeater repeats the signal indicative of the characteristic along the communication path toward the controller.

The present disclosure also relates to a wireless waveguide system for a heating, ventilation, and air conditioning (HVAC) system. The wireless waveguide system includes ductwork that defines an airflow path therethrough and a controller of an HVAC unit. A sensor detects an environmental condition and directs a signal indicative of the environmental condition along the airflow path. A repeater is disposed within the ductwork along the airflow path. The repeater repeats the signal indicative of the environmental condition further along the airflow path and toward the controller.

BRIEF DESCRIPTION OF THE DRAWINGS

Some embodiments will become more fully understood from the following detailed description, taken in conjunction with the accompanying drawings, wherein like reference numerals refer to like elements, in which.

DETAILED DESCRIPTION

HVAC systems include various pieces of equipment in order to control the climate within a building. Some of this equipment includes HVAC units, such as air handling units (AHU), that rest on the rooftops of buildings. Operation of these HVAC units is controlled using feedback from one or more sensors inside of the building. These sensors may include dynamic pressure sensors, temperature sensors, flow rate sensors, carbon dioxide sensors, humidity level sensors, air quality sensors, motion sensors, among others. For example, motion sensors may detect the presence of one or more people. This information is communicated to a controller which then controls the HVAC system to control the climate in an enclosed space.

To facilitate communication between the sensors and a controller controlling the HVAC unit, the HVAC system may include a wireless waveguide system. The wireless waveguide system includes one or more wireless devices that facilitate communication between the sensors and the HVAC unit controller using the building's ductwork. For example, these wireless devices may be placed within the ductwork to facilitate transmission of the signals from the sensors to the HVAC unit controller. Examples of wireless devices used in the wireless waveguide system may include transmitters, receivers, signal sensors, signal repeaters, among others. Use of the wireless waveguide system therefore reduces the number of perforations in the building envelope in order to communicate with an HVAC unit controller. As explained above, perforations in the building envelope may enable water, air, and pests to enter the building as well as increases the costs of setting up and operating an HVAC system.

Figure 1:
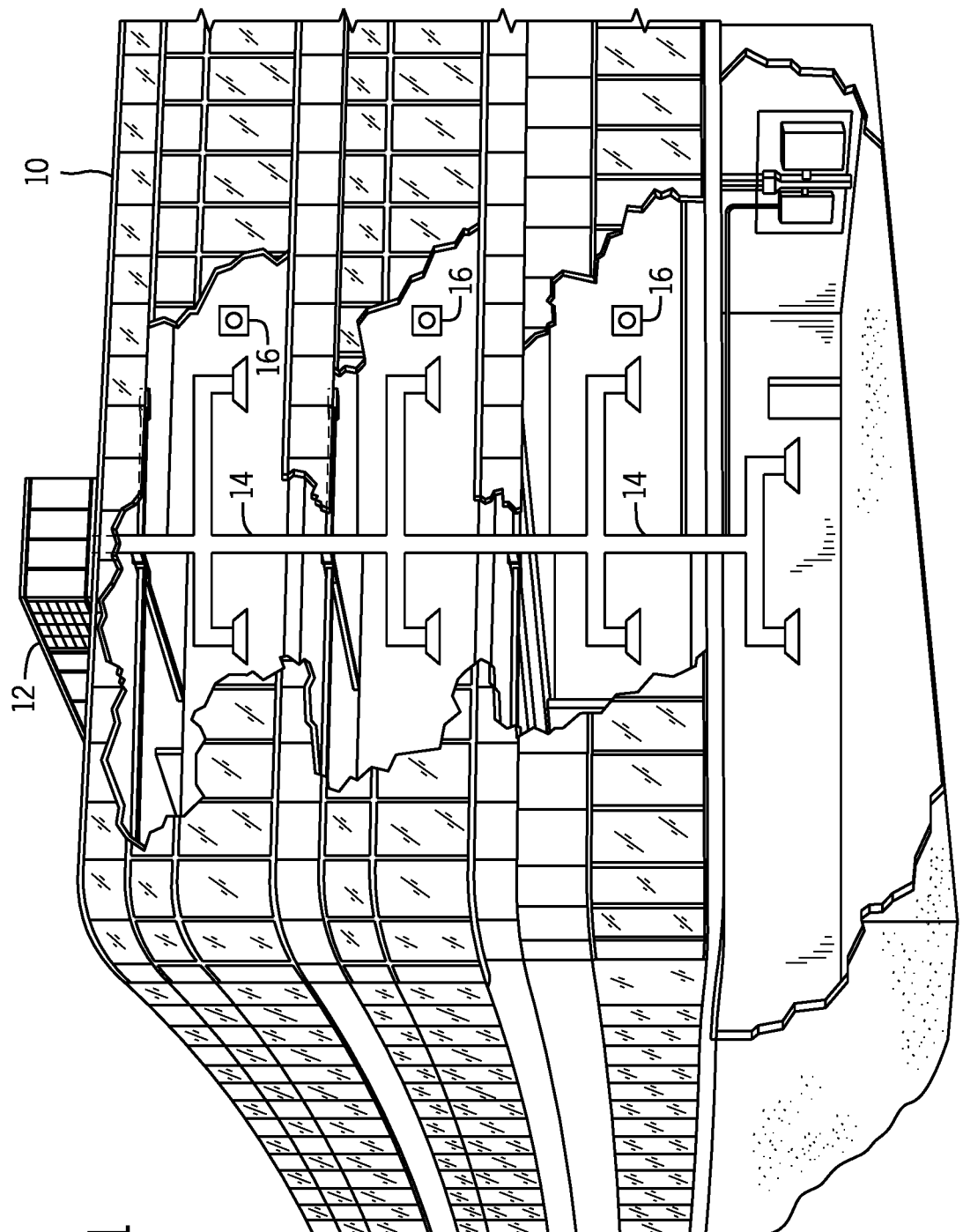
FIG. 1 is a perspective view of an embodiment of a building that may utilize a heating, ventilation, and air conditioning (HVAC) system in a commercial setting, in accordance with an aspect of the present disclosure.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air-cooled device that implements a refrigeration cycle to provide conditioned air to the building 10. Specifically, the HVAC unit 12 may include one or more heat exchangers across which an airflow is passed to condition the airflow before the airflow is supplied to the building. In the illustrated embodiment, the HVAC unit 12 is a rooftop unit (RTU) that conditions a supply air stream, such as environmental air and/or a return airflow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
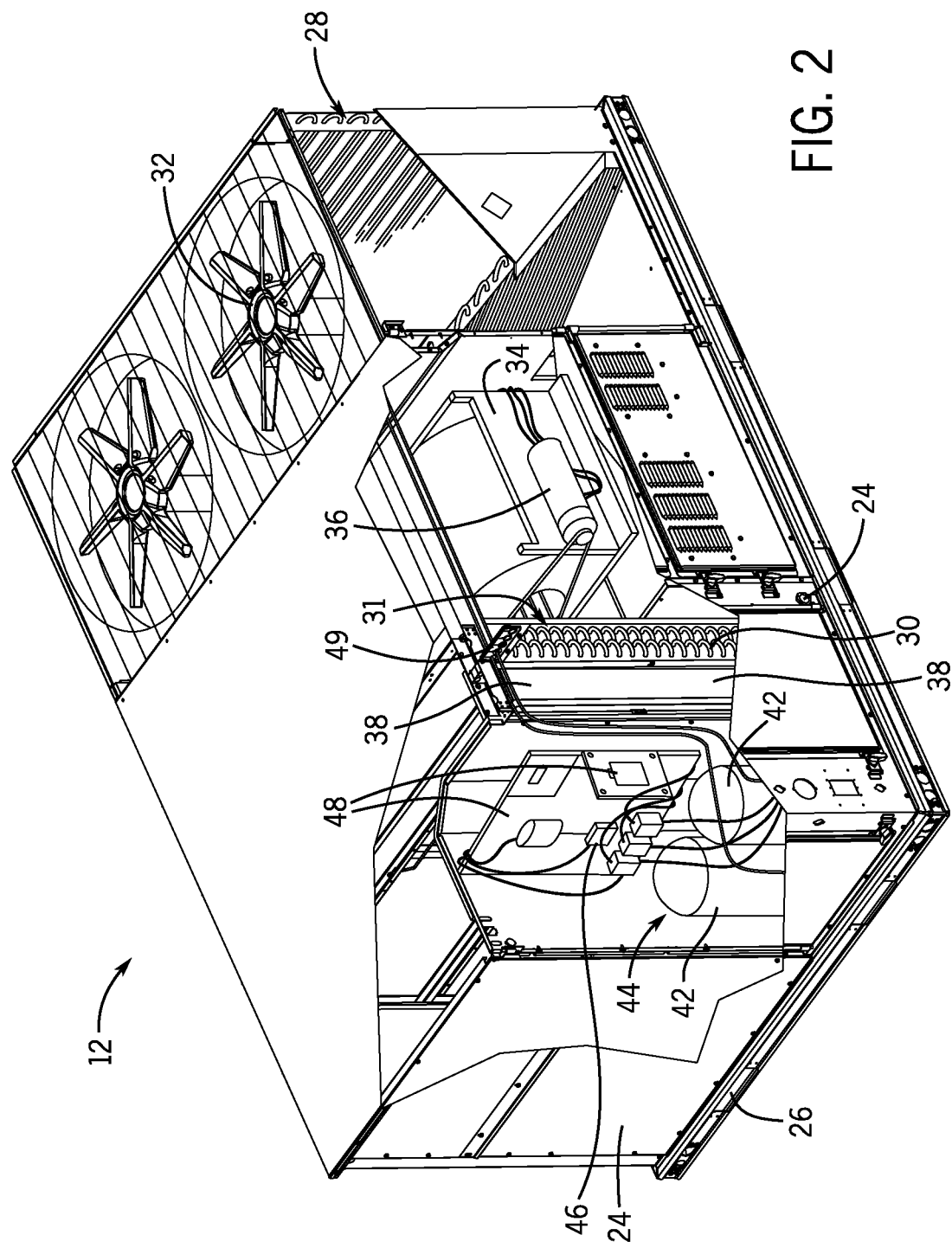
FIG. 2 is a perspective view of an embodiment of an HVAC unit of the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned airflows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms, one or more which may be referred to separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
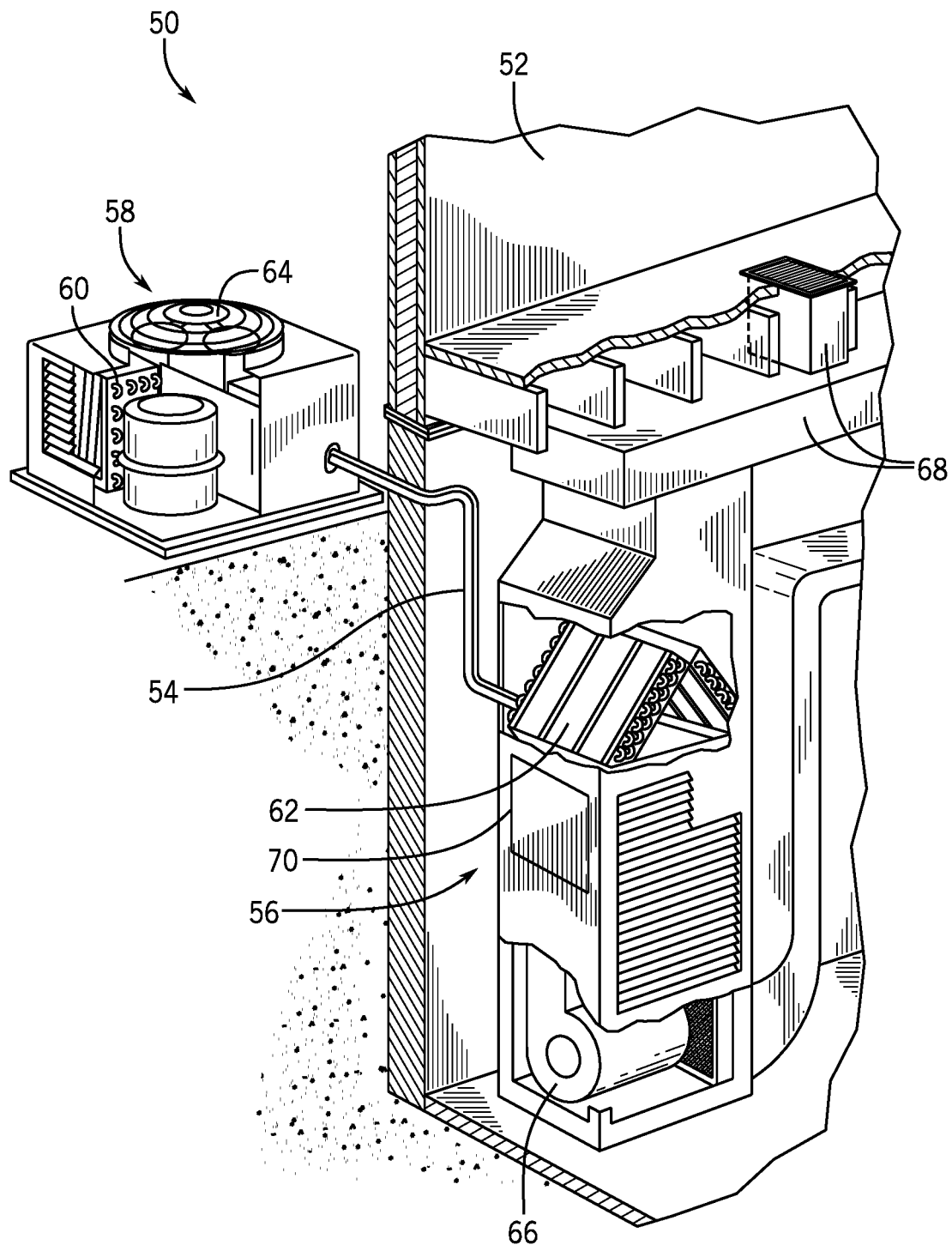
FIG. 3 is a perspective view of an embodiment of a residential, split HVAC system that includes an indoor HVAC unit and an outdoor HVAC unit, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
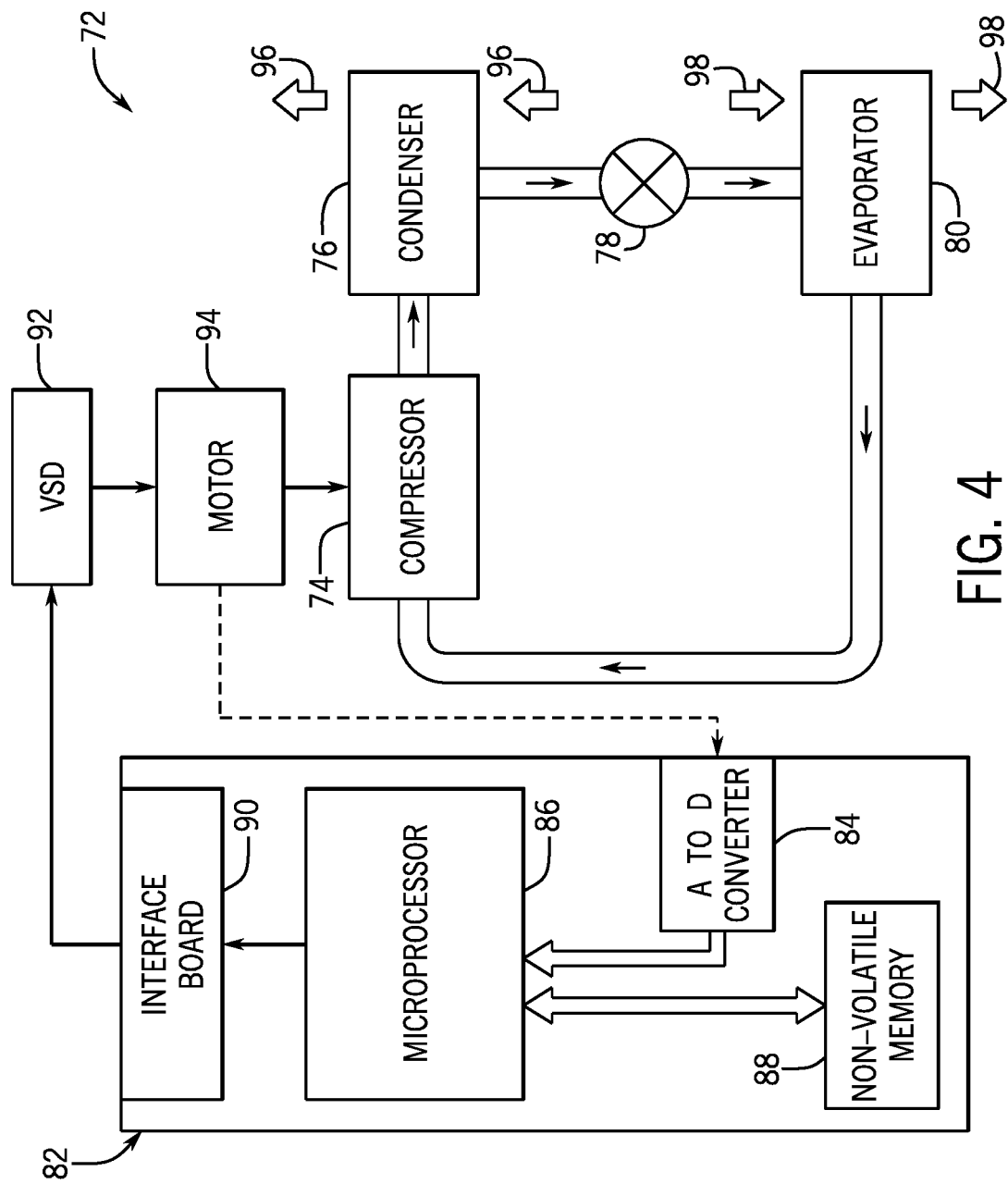
FIG. 4 is a schematic of an embodiment of an HVAC system, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
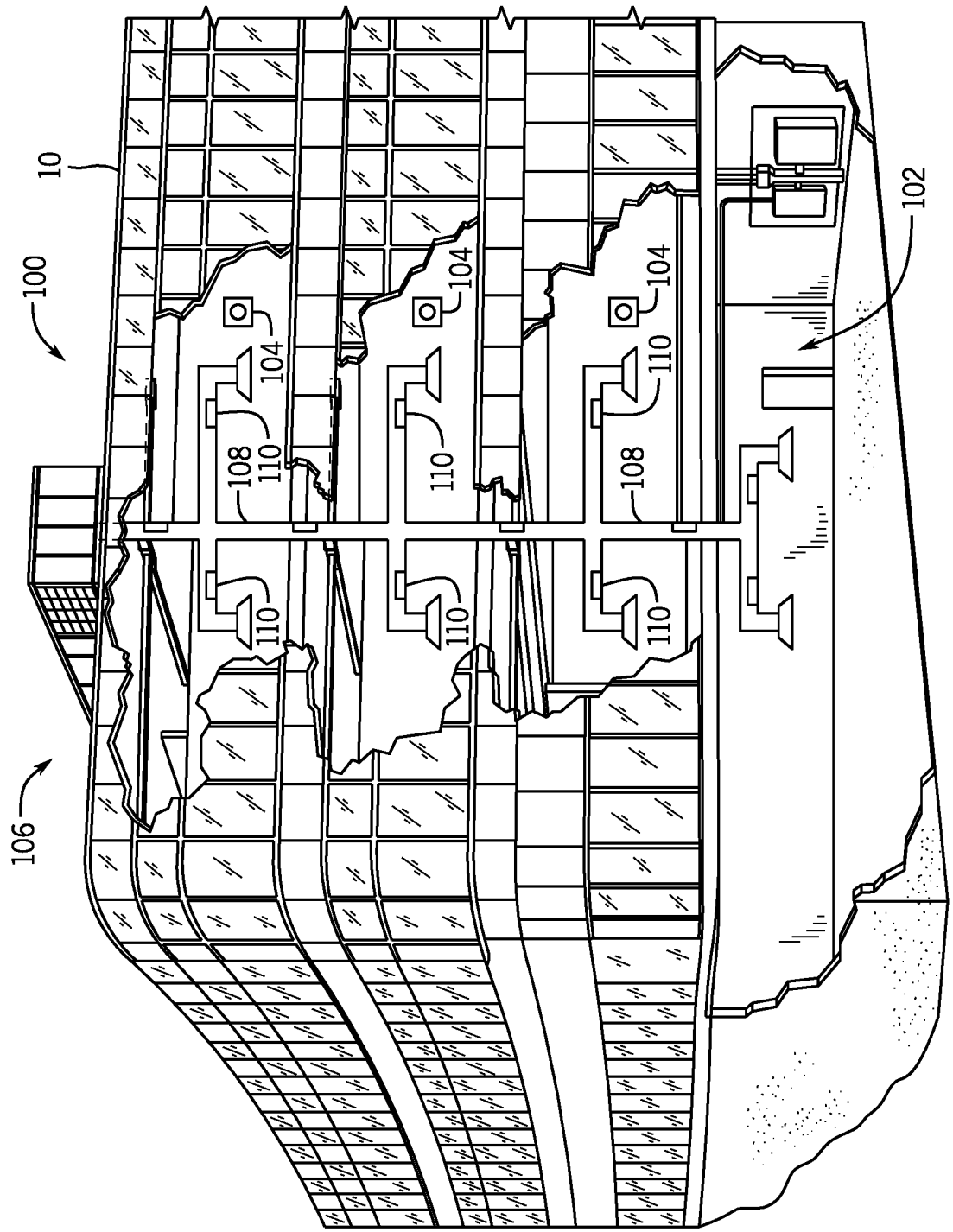
FIG. 5 is a perspective view of an embodiment of a building with an HVAC system that includes a wireless waveguide system, in accordance with an aspect of the present disclosure.

FIG. 5 is a perspective view of an HVAC system 100 with a wireless waveguide system 102 that facilitates communication from one or more sensors 104 to an HVAC unit 106. As illustrated, the HVAC unit 106 is disposed on the roof of the building 10. This may place the roof, one or more ceilings, and one or more walls between the controller of the HVAC unit 106 and the sensors 104. These structures may interfere with wireless communication, and thus control, of the HVAC system 100. However, the wireless waveguide system 102 facilitates communication between the HVAC unit 106 and the sensors 104 by transmitting the wireless signal through the interior of the ductwork 108 in the building 10. By using the ductwork 108, the wireless waveguide system 102 enables communication while simultaneously reducing perforations of the walls, ceilings, and/or the roof in order to install communication cables and/or wireless antennas. As will explained in detail below, the wireless waveguide system 102 may include one or more wireless devices 110 placed within the ductwork 108 that facilitate signal transmission from one or more sensors 104 to the controller of the HVAC unit 106.

In some embodiments, the HVAC unit 106 may be located in other equipment rooms or areas adjacent the building 10. The HVAC unit 106 may include a single packaged unit containing other equipment, such as a blower, integrated air handler, and/or auxiliary heating unit. In other embodiments, the HVAC unit 106 may be a split HVAC system, such as the system shown in FIG. 3, which includes the outdoor HVAC unit 58 and the indoor HVAC unit 56. However, regardless of the HVAC system setup, the wireless waveguide system 102 facilitates communication between the sensors 104 and the HVAC unit 106.

The HVAC system 100 uses a refrigeration cycle to provide conditioned air to the building 10. Specifically, the HVAC system 100 may include one or more heat exchangers across which an air flow is passed, which conditions the airflow before the airflow is supplied to the building. In the illustrated embodiment, the HVAC unit 106 is a rooftop unit (RTU) that conditions a supply air stream, such as environmental air and/or a return airflow from the building 10. After the HVAC system 100 conditions the air, the air is supplied to the building 10 via ductwork 108 extending throughout the building 10 from the HVAC system 100. For example, the ductwork 108 may extend to various floors or other sections of the building 10. In some embodiments, the HVAC system 100 may include one or more refrigeration circuits for cooling an air stream and a furnace for heating the air stream.

Controllers and/or sensors 104, one type of which may be a thermostat, may be used to designate the temperature of the conditioned air. These devices may also be used to control the flow of air through the ductwork 108. For example, the controllers and/or sensors 104 may be used to regulate operation of one or more components of the HVAC system 100, such as dampers and fans, within the building 10 that may control flow of air through and/or from the ductwork 108.

Figure 6:
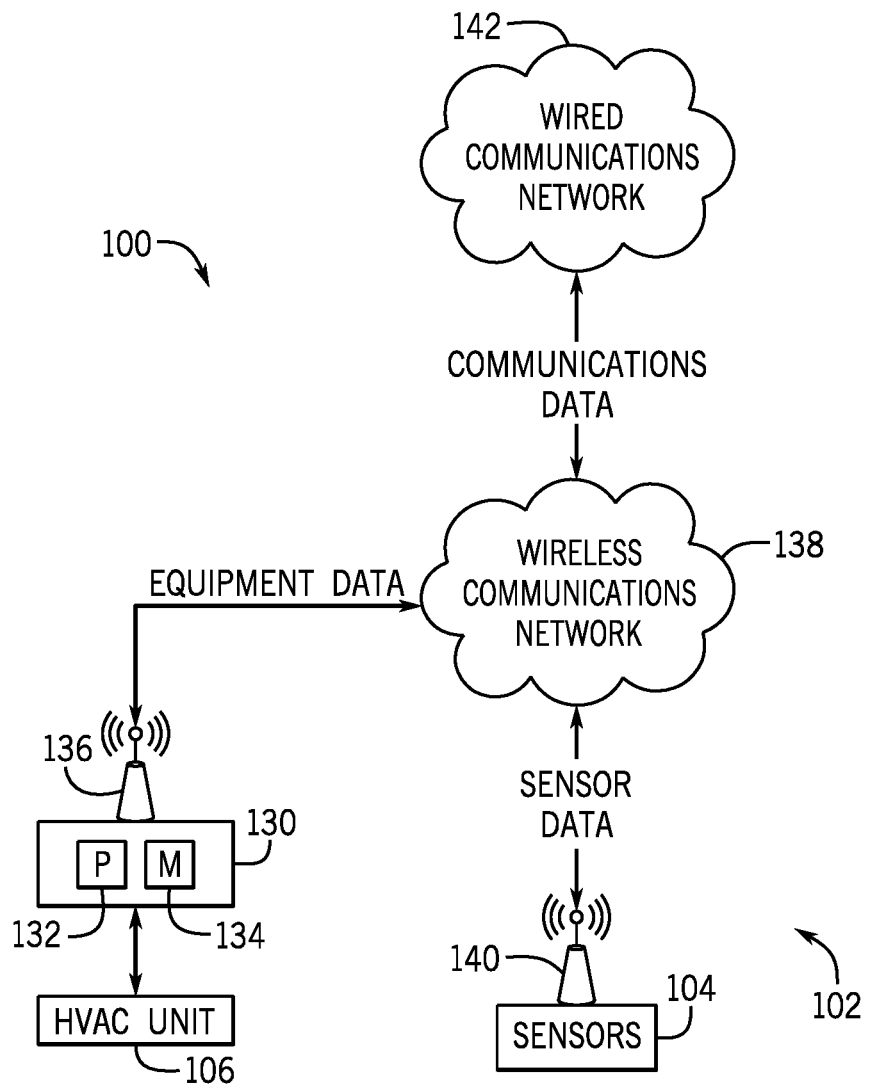
FIG. 6 is a schematic view of an embodiment of an HVAC system with a wireless waveguide system, in accordance with an aspect of the present disclosure.

FIG. 6 is a schematic view of the HVAC system 100 with the wireless waveguide system 102. As explained above, the HVAC system 100 includes one or more HVAC units 106, such as a roof top unit. The HVAC unit 106 includes a controller 130 configured to monitor and/or control the HVAC unit 106. The controller 130 includes a processor 132 and a memory 134. For example, the processor 132 may be a microprocessor that executes software to control the HVAC unit 106. The processor 132 may include multiple microprocessors, one or more "general-purpose" microprocessors, one or more special-purpose microprocessors, and/or one or more application specific integrated circuits (ASICS), or some combination thereof. For example, the processor 132 may include one or more reduced instruction set (RISC) processors.

The memory 134 may include a volatile memory, such as random access memory (RAM), and/or a nonvolatile memory, such as read-only memory (ROM). The memory 134 may store a variety of information and may be used for various purposes. For example, the memory 134 may store processor executable instructions, such as firmware or software, for the processor 132 to execute. The memory may include ROM, flash memory, a hard drive, or any other suitable optical, magnetic, or solid-state storage medium, or a combination thereof. The memory may store data, instructions, and any other suitable data.

Coupled to the controller 130 is a wireless interface 136. The wireless interface 136 may be any device configured for wireless communications with wireless communications network 138, and/or configured for wired and/or wireless communication with controller 130. Although FIG. 6 shows one controller 130, one HVAC unit 106, and one wireless interface 136, it should be understood that other embodiments may include additional HVAC equipment controllers 130, HVAC units 106, and wireless interfaces 136.

In operation, the controller 130 may receive equipment data from the HVAC unit 106 and subsequently transmit that data to the wireless communications network 138 via wireless interface 136. Likewise, the controller 130 may receive equipment data from the wireless communications network 138 via the wireless interface 136, which then transmits the data to the HVAC unit 106. Data communication via the wireless communications network 138 may be implemented using any suitable wireless communication protocol such as 802.11a/b/g/n/ac, Bluetooth, RFID, and at any suitable frequency band, such as 2.4 GHz, 5 GHz, or 5.8 GHz.

As explained above, the HVAC unit 106 may be controlled in response to feedback from sensors 104. These sensors 104 may be any type of sensor used in HVAC systems, such as dynamic pressure sensors, temperature sensors, flow rate sensors, carbon dioxide sensors, humidity level sensors, air quality sensors, motion sensors, among others. These sensors may couple to wireless transmitters 140 that transmit data indicative of the measured property. The wireless transmitters 140 transmit this information to the wireless communications network 138. The wireless communications network carries this data to the controller 130, which then controls operation of the HVAC unit 106 in response to the data.

In some embodiments, the wireless communications network 138 may communicate with a wired communications network 142. The wired communications network 142 may include network devices that facilitate wireless transmission throughout the building 10 or another enclosed space. For example, the wired communications network 142 may include wireless gateways, routers, hubs, switches, signal sensors, signal repeaters, interconnecting cables and wiring.

In some embodiments, the wireless communications network 138 includes one or more network devices configured to send and receive data to one or more network devices in wired communications network 142. For example, the wireless communications networks 138 may include a Wi-Fi router or similar device with an interface configured to communicate with a compatible interface in the wired communications network 142. In this regard, components that directly communicate with the wireless communications network 138, such as the HVAC unit 106 and sensors 104, may communicate with other components that are configured to directly communicate with wired communications network 142. Accordingly, FIG. 6 is not intended to limit possible configurations of the wireless communications network 138, possible configurations of wired communications network 142, and the interconnection of various components, such as the HVAC unit 106 and sensors 104, in the HVAC system 100.

Figure 7:
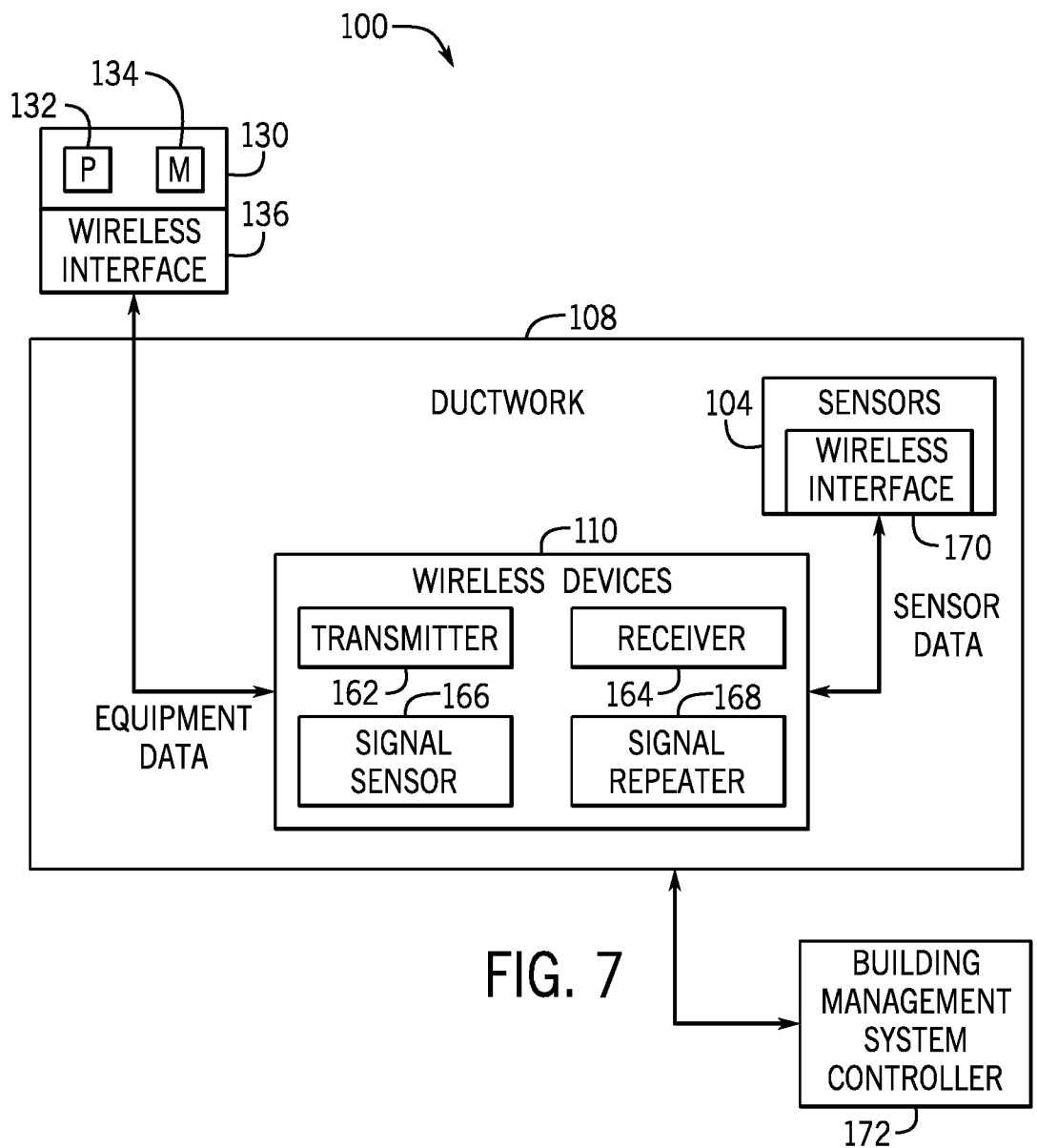
FIG. 7 is a schematic view of an embodiment of a wireless waveguide system, in accordance with an aspect of the present disclosure.

FIG. 7 is a schematic view of an embodiment of the HVAC system 100 with the wireless waveguide system 102. In operation, the wireless waveguide system 102 uses the electrical and mechanical properties of the ductwork 108 to efficiently contain and propagate wireless signals through portions of or all of the ductwork 108.

As explained above, the HVAC system 100 includes the HVAC unit 106, such as a rooftop unit, for cooling the building 10. The HVAC unit 106 is controlled with the controller 130. As illustrated, the controller 130 may couple to and/or include the wireless interface 136 that enables the controller 130 to receive wireless signals used in controlling the HVAC unit 106. The wireless interface 136 enables data communications with wireless devices 110 and/or other devices capable of wireless communication. In this regard, wireless interface 136 may include a Wi-Fi transceiver, cellular or mobile phone transceiver, antennas, among others. In some embodiments, the controller 130 uses an external device for sending and receiving wireless communications, and wireless interface 136 may interface with the external device via wired connection, such as Ethernet and coaxial cable. For example, in some embodiments, the controller 130 is provided outside building 10 on a rooftop, whereas a transmitter 162 is an independent device capable of wireless communications and is located inside the building 10. More specifically, the transmitter 162 is located inside ductwork 108 of the building 10. In this regard, wireless interface 136 is communicatively connected via wired connection to the transmitter 162 located inside building 10.

The wireless interface 136 can generally be configured to facilitate communication of equipment data between controller 130 and wireless devices 110. For example, the wireless interface 136 may communicate with transmitters 162, receivers 164, signal sensors 166, and/or signal repeaters 168. These wireless devices in turn communicate with one or more sensors 104. Types of sensors 104 include dynamic pressure sensors, temperature sensors, flow rate sensors, carbon dioxide sensors, humidity level sensors, air quality sensors, motion sensors, among others. The sensors 104 each include a wireless interface 170 that facilitates communication of sensor data to and/or from one or more wireless devices 110. For example, static pressure sensors can be dispersed throughout building 10 to facilitate control of static pressure level in the ductwork 108. Any number and/or type of static pressure sensors may be provided. The number and type of static pressure sensors may vary based on the size of building 10 and requirements of the HVAC system 100. For example, a network of static pressure sensors in ductwork 108 may be vertically implemented across various floors of building 10 and also horizontally implemented throughout each of the various floors.

The wireless interface 170 can generally be configured to facilitate communication of sensor data between the static pressure sensors and one or more wireless devices 110. In this regard, static pressure sensors can provide sensor data to wireless devices 110, and wireless devices 110 can subsequently transmit the sensor data to the controller 130. In response to the sensor data, the controller 130 may send control commands to various components, such as fans and actuators, in the HVAC unit 106 or in the building 10, thereby adjusting the supply of conditioned air to meet changing demands.

In FIG. 7, the ductwork 108 is shown to include wireless devices 110. In some embodiments, wireless devices 110 are provided to enable wireless communication for other systems, such as a building management system (BMS). For example, wireless devices 110 can be configured to send and receive equipment data between the controller 130 and a BMS controller 172. Wireless devices 110 may also be configured to send and receive sensor data between the sensors 104 and the BMS controller 172. Furthermore, wireless devices 110 may be configured to send and receive communication data between the BMS controller 172 and various building components in a building management system. In some embodiments, a set of wireless devices 110 is provided for wireless communication among the set of wireless devices 110, for example, to extend the range of wireless signals sent and received by the wireless devices 110 or other wireless communication components.

Wireless devices 110 can be configured for communication with devices both internal to the ductwork 108 and/or external to the ductwork 108. For example, wireless devices 110 can be configured within one end of a duct in ductwork 108 in a manner that uses the ductwork 108 as a waveguide. In particular, the electrical and mechanical properties of ductwork 108 may be advantageously used such that wireless signals are efficiently contained and propagated through portions of the ductwork 108. In this regard, using the interior space defined by the ductwork 108 as a waveguide may extend the range of a wireless signal both vertically across floors of building 10 and horizontally across each floor of building 10.

As mentioned above, the wireless devices 110 may include transmitters 162, receivers 164, signal sensors 166, and/or signal repeaters 168. The type, number, and configuration of wireless devices 110 may vary. In this regard, embodiments may vary based on size and other characteristics of the building 10, the HVAC system 100, among others. For example, a set of transmitters 162, receivers 164, signal sensors 166, and signal repeaters 168, may be vertically implemented across various floors of the building 10 in the ductwork 108, and another set of wireless devices 110 can be horizontally implemented throughout each of the various floors through the ductwork 108.

In FIG. 7, the wireless devices 110 are shown to include the transmitter 162. The transmitter 162 may be any device capable of receiving data input, such as equipment data and sensor data, and transmitting the received data to a device capable of receiving the transmitted data, such as receiver 164. For example, the transmitter 162 can be configured to receive equipment data from the controller 130 via the wireless interface 136 and subsequently send the received equipment data to one of the wireless devices 110. The transmitter 162 can also be configured to receive data from wireless devices 110. In some embodiments, the transmitter 162 is mounted within a predetermined proximity in relation to the controller 130, such as on a rooftop of building 10. In some embodiments, the transmitter 162 is mounted below the controller 130 and within ductwork 108. For example, the transmitter 162 may be mounted in the return side of ductwork 108 leading up to the controller 130.

In some embodiments, mounting the transmitter 162 in the ductwork 108 may optimize transmission of wireless signals. For example, the interior reflective surfaces of the ductwork 108 may cause transmitted signals to reflect and cause cancellation of transmitted waves, thereby reducing throughput of wireless communications. In this regard, transmitters 162 may be mounted in relation to reflective surfaces of the ductwork 108 to minimize undesirable transmission properties.

In some embodiments, the transmitter 162 may be mounted at a predetermined distance in relation to internal surfaces of the ductwork 108, such that reflected waves are in phase with incoming waves. For example, the transmitter 162 may be mounted at a calculated distance (d) from internal surfaces of ductwork 108 according to the following equation:

$$d = \lambda + \tfrac{1}{4}\lambda$$

where $\lambda$ is the wavelength of a wireless signal sent by the transmitter 162. For example, in some embodiments, the transmitter 162 sends a wireless signal at a frequency of 2.4 GHz. In this regard, wavelength ($\lambda$) may be approximately 12.5 cm, and the calculated distance (d) is approximately 15.625 cm. Thus, the transmitter 162 may be mounted at a distance (d) of 15.625 cm from an internal surface of the ductwork 108.

As mentioned above, the wireless devices 110 may include the receiver 164. The receiver 164 can be any device capable of receiving wireless communication signals via an antenna communicably connected to the receiver 164. In some embodiments, the receiver 164 provides the received data to other wireless devices 110, the BMS controller 172, the controller 130, the sensors 104, and/or any device in the HVAC system 100. To this end, the receiver 164 may provide received data via a wired or wireless connection to wireless devices 110, the BMS controller 172, the controller 130, the sensors 104, and/or any device in the HVAC system 100.

In some embodiments, the receiver 164 can be configured to address transmission consequences arising from multipath propagation. Multipath propagation may occur when reflective surfaces internal to the ductwork 108 cause transmitted signals to reflect, and in turn cause signal paths to vary as they reaches their destination. This may cause wireless signals to be received at different times and may reduce throughput of wireless communication.

In some embodiments, the receiver 164 may be configured to employ a diversity system generally configured to include two or more antennae spaced at a predetermined distance apart from each other. For example, the receiver 164 may be configured to employ a diversity system with two integral antennae. The receiver 164 may choose a preferred antenna by sampling throughput at each of the two antennae and may compare the sampling results to determine a maximum throughput. In some embodiments, when the receiver 164 detects a suboptimal wireless signal at a first antenna, the receiver 164 may switch to a second antenna and begin receiving data from the second antenna.

The wireless devices 110 may also include the signal sensor 166 and signal repeater 168. The signal sensor 166 is generally configured to receive a wireless signal and determine various performance characteristics of the wireless signal. For example, the signal sensor 166 may be configured to determine an amplitude and/or throughput capability of received wireless signals. In some embodiments, the signal sensor 166 may be mounted at various locations internal to the ductwork 108 to sense transmission characteristics of wireless signals. The signal sensor 166 may be mounted in a hollow cavity of the ductwork 108, or the signal sensor 166 may be mounted external to the ductwork 108.

In some embodiments, the signal repeater 168 is generally configured to receive a wireless signal, amplify the signal, and subsequently transmit the amplified signal via an integral antenna or transmitter device. In this regard, the signal repeater 168 is configured to increase the range of a wireless signal and/or increase throughput. Moreover, the signal repeater 168 may be any device capable of boosting, repeating, extending wireless signal range, or otherwise improving wireless performance. For example, in some embodiments, the signal repeater 168 employs an integral processor configured to reduce signal noise in received wireless signals. The signal repeater 168 can then amplify the processed wireless signal and subsequently transmit the amplified signal via an integral antenna.

Signal sensors 166 and signal repeaters 168 may be placed at various locations in the building 10 and/or within the HVAC system 100 to facilitate transmission of the wireless signal. For example, the signal sensor 166 and signal repeater 168 may be mounted around a 90° bend in the ductwork 108, such that wireless signals at one end of a 90° bend can be received at transmitted around the 90° bend. It should be understood that the ductwork 108 may include multiple bends with different angles ranging from approximately 20°-180°, and that some or all of these bends may include signal sensors 166 and signal repeaters 168 that facilitate transmission of the wireless signal.

In some embodiments, the signal sensor 166 may take various actions in response to input received from other wireless devices 110 and/or the BMS controller 172. For example, in some embodiments, when the signal sensor 166 detects a low signal strength, such as low signal amplitude, it can cause the signal repeater 168 to operate. In some embodiments, the signal sensor 166 sends communication data relating to received wireless signals to the BMS controller 172.

Figure 8:
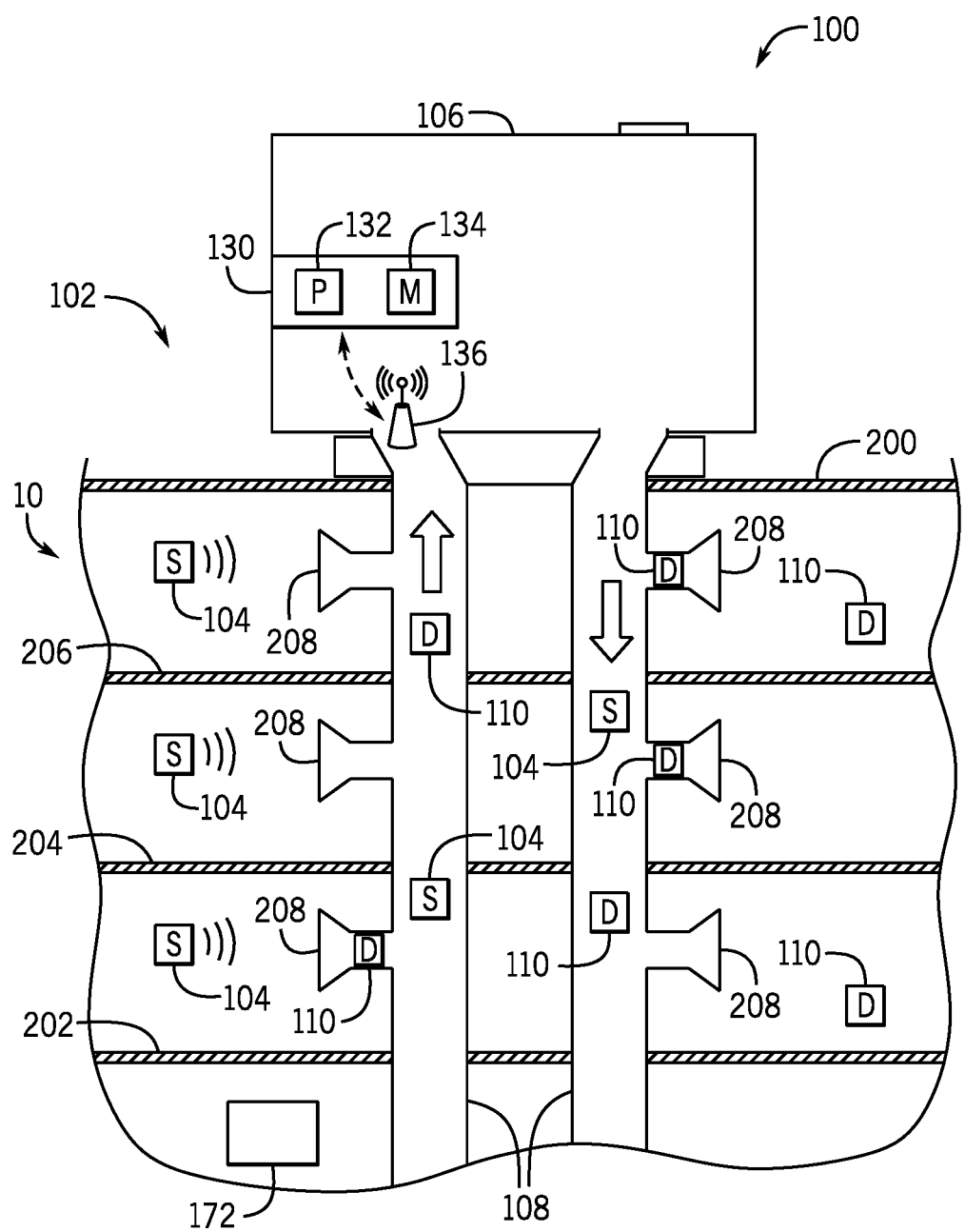
FIG. 8 is a partial cross-sectional view of an embodiment of a building with an HVAC system and wireless waveguide system, in accordance with an aspect of the present disclosure.

FIG. 8 is a partial cross-sectional view a portion of the building 10 with the wireless waveguide system 102. As illustrated, the HVAC system 100 includes the HVAC unit 106, such as a rooftop unit. The HVAC unit 106 may be spaced any suitable distance from rooftop 200 and/or affixed to a rooftop curb. The controller 130 of the HVAC unit 106 is communicatively connected to the wireless interface 136 located on the return side of the ductwork 108 leading up to HVAC unit 106. The controller 130 may communicate with wireless interface 136 using a wired or wireless connection. Sensors 104 are shown to be vertically distributed throughout the building 10 across floors 202, 204, 206. The sensors 104 may be dynamic pressure sensors, temperature sensors, flow rate sensors, carbon dioxide sensors, humidity level sensors, air quality sensors, among others, that communicate with the controller 130 via the wireless interface 136. As explained above, the controller 130 controls operation of the HVAC unit 106 in response to feedback from the sensors 104. For example, the HVAC unit 106 may operate to heat, cool, or blow air into the building 10 in response to feedback received from the sensors 104.

In order to transmit the signals from the sensors 104, the wireless waveguide system 102 uses the ductwork 108 of the building 10. For example, placement of the sensors 104 within a threshold distance of openings 208, such as registers or vents, enables the ductwork 108 to propagate the signal from the sensor 104 to the wireless interface 136. In some embodiments, the threshold distance between the sensors 104 and the openings 208 may be less than 15 ft, 10 ft, or 5 ft. In other embodiments, additional wireless devices 110 may facilitate transmission of the signal to the controller 130. These wireless devices 110 may include one or more of the transmitters 162, receivers 164, signal sensors 166, and signal repeaters 168 described above. These wireless devices 110 may be placed within the ductwork 108, at the openings 208, and/or in other locations in with building 10, such as in rooms outside of the ductwork 108. In operation, the wireless waveguide system 102 facilitates wireless communication from one or more sensors 104 to the controller 130 of the HVAC unit 106 and/or another controller, such as the BMS controller 172. In this way, the wireless waveguide system 102 may enable and improve wireless communication while simultaneously reducing the use of cables and associated perforations of the building 10 to run communication cables.

The construction and arrangement of the systems and methods as shown in the various exemplary embodiments are illustrative only. Although only a few embodiments have been described in detail in this disclosure, many modifications are possible including variations in sizes, dimensions, structures, shapes and proportions of the various elements, values of parameters, mounting arrangements, use of materials, colors, orientations, among others. For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems, and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data that cause a general purpose computer, special purpose computer, or special purpose processing machines to perform a certain function or group of functions.

The invention claimed is:

1. A heating, ventilation, and air conditioning (HVAC) system, comprising:
   an HVAC unit comprising a vapor compression system configured to condition an air flow and a controller disposed within the HVAC unit and configured to regulate operation of the vapor compression system;
   ductwork extending between the HVAC unit and a space within a building, wherein the ductwork is configured to direct the air flow from the HVAC unit to the space within the building; and
   a wireless waveguide system, comprising:
   a sensor configured to detect an environmental condition and to direct a signal indicative of the environmental condition along an interior of the ductwork; and
   a wireless communications network communicatively coupled to the sensor and to the controller, wherein the wireless communications network comprises one or more wireless devices configured to direct the signal from the sensor, along the interior of the ductwork, and to the controller of the HVAC unit,
   wherein the controller is configured to regulate operation of the HVAC unit to heat the air flow, cool the air flow, direct the air flow into the space, or any combination thereof, based on the signal received from the sensor.

2. The HVAC system of claim 1, wherein the one or more wireless devices comprise:
   a signal sensor configured to detect a strength of the signal within the interior of the ductwork; and
   a repeater configured to operate based on the strength of the signal detected by the signal sensor and configured to repeat the signal along a communication path at least partially within the interior of the ductwork to the controller of the HVAC unit.

3. The HVAC system of claim 2, wherein the ductwork comprises a bend, and the repeater is positioned inside the ductwork substantially at the bend.

4. The HVAC system of claim 1, wherein the sensor is positioned within the ductwork.

5. The HVAC system of claim 1, wherein the sensor is positioned outside of the ductwork.

6. The HVAC system of claim 1, wherein the sensor comprises a wireless transmitter configured to emit the signal indicative of the environmental condition.

7. The HVAC system of claim 1, wherein the controller comprises a wireless interface configured to receive the signal via the wireless communications network.

8. The HVAC system of claim 7, comprising a transmitter disposed within the ductwork, wherein the wireless interface is configured to transmit a second signal comprising equipment data to the transmitter, and the transmitter is configured to transmit the second signal to at least one wireless device of the one or more wireless devices.

9. The HVAC system of claim 1, wherein the HVAC unit is positioned external to the building.

10. The HVAC system of claim 9, wherein the sensor is configured to detect the environmental condition within the building, and the sensor comprises a pressure sensor, a temperature sensor, a flow rate sensor, a carbon dioxide sensor, a humidity level sensor, an air quality sensor, a motion sensor, or any combination thereof.

11. The HVAC system of claim 10, wherein the controller is configured to regulate operation of the vapor compression system based on the signal.

12. A heating, ventilation, and air conditioning (HVAC) system, comprising:
an HVAC unit, comprising:
a vapor compression system disposed within the HVAC unit, wherein the vapor compression system is configured to condition an air flow; and
a controller disposed within the HVAC unit and configured to regulate operation of the vapor compression system, wherein the controller comprises a wireless interface configured to receive wireless signals, and wherein the HVAC unit is configured to discharge the air flow toward a space within a building to condition the space;
ductwork extending between the HVAC unit and the space within the building, wherein the ductwork is configured to direct the air flow from the HVAC unit to the space, direct an additional air flow from the space to the HVAC unit, or both;
a sensor configured to detect an environmental condition within the building and to output a signal indicative of the environmental condition; and
a wireless waveguide system comprising one or more wireless devices positioned within an interior of the ductwork, wherein the one or more wireless devices are configured to transmit the signal along the interior of the ductwork to the wireless interface of the controller, and wherein the controller is configured to regulate operation of the HVAC unit to heat the air flow, cool the air flow, direct the air flow into the space, or any combination thereof, based on the signal received via the wireless interface.

13. The HVAC system of claim 12, wherein the sensor is positioned within the space.

14. The HVAC system of claim 12, wherein the sensor is positioned within the interior of the ductwork.

15. The HVAC system of claim 12, wherein the one or more wireless devices comprises a signal repeater configured to receive the signal, amplify the signal, and transmit the signal along the interior of the ductwork.

16. A heating, ventilation, and air conditioning (HVAC) system, comprising:
an HVAC unit comprising a vapor compression system configured to condition a supply air flow and a controller disposed within the HVAC unit and configured to regulate operation of the vapor compression system, wherein the controller comprises a wireless interface;
ductwork extending from the HVAC unit to a space within a building, wherein the ductwork is configured to direct the supply air flow from the HVAC unit to the space within the building and to direct a return air flow from the space to the HVAC unit; and
a wireless waveguide system, comprising:
a sensor configured to detect an environmental parameter within the building and to output a signal indicative of the environmental parameter; and
a wireless communications network communicatively coupled to the sensor and to the wireless interface, wherein the wireless communications network comprises one or more wireless devices disposed within an interior of the ductwork and configured to direct the signal along the interior of the ductwork and to the wireless interface of the controller
wherein the controller is configured to regulate operation of the HVAC unit to heat the supply air flow, cool the supply air flow, direct the supply air flow into the space, or any combination thereof, based on the signal received via the wireless interface.

17. The HVAC system of claim 16, wherein the controller is configured to transmit equipment data from the HVAC unit to the wireless communications network via the wireless interface.

18. The HVAC system of claim 16, wherein the one or more wireless devices comprise:
a signal sensor configured to detect a strength of the signal within the interior of the ductwork; and
a repeater configured to operate based on the strength of the signal detected by the signal sensor and configured to repeat the signal along a communication path within the interior of the ductwork toward the wireless interface of the controller.

* * * * *